US011845341B2

(12) United States Patent
Bergner et al.

(10) Patent No.: US 11,845,341 B2
(45) Date of Patent: Dec. 19, 2023

(54) OPERATION OF SWITCHING ELEMENTS OF AN INVERTER OF AN IN PARTICULAR RAIL-BOUND VEHICLE DRIVEN BY WAY OF LEAST ONE AT LEAST THREE-PHASE SYNCHRONOUS MACHINE (71) Applicant: Siemens Mobility GmbH, Munich (DE)

(72) Inventors: Hans Bergner, Karlsruhe (DE); Juergen Ditterich, Nuremberg (DE); Karsten Hoke, Schoenbeck OT Pretzien (DE); Niklas Rueger, Rosstal (DE)

(73) Assignee: Siemens Mobility GmbH, Munich (DE)

( * ) Notice: Subject to any disclaimer, the term of this patent is extended or adjusted under 35 U.S.C. 154(b) by 305 days.

(21) Appl. No.: 17/415,109

(22) PCT Filed: Dec. 12, 2019

(86) PCT No.: PCT/EP2019/084820
§ 371 (c)(1),
(2) Date: Jun. 17, 2021

(87) PCT Pub. No.: WO2020/126794
PCT Pub. Date: Jun. 25, 2020

(65) Prior Publication Data
US 2022/0055485 A1 Feb. 24, 2022

(30) Foreign Application Priority Data
Dec. 17, 2018 (EP) .................................... 18213075

(51) Int. Cl.
*H02P 3/18* (2006.01)
*H02P 27/06* (2006.01)
*B60L 15/04* (2006.01)

(52) U.S. Cl.
CPC ................ *B60L 15/04* (2013.01); *H02P 3/18* (2013.01); *H02P 27/06* (2013.01); *B60L 2200/26* (2013.01)

(58) Field of Classification Search
CPC ...... B60L 15/04; B60L 2200/26; H02P 27/06; H02P 3/18
See application file for complete search history.

(56) References Cited

U.S. PATENT DOCUMENTS

| 6,938,555 B2 | 9/2005 | Joeckel |
| 7,982,418 B2 * | 7/2011 | Jobard .................... B60L 7/003 318/245 |

(Continued)

FOREIGN PATENT DOCUMENTS

| DE | 10160612 A1 | 6/2003 |
| WO | WO2016107707 A1 | 7/2016 |

OTHER PUBLICATIONS

Steffen Bernet: "Selbstgefuehrte Stromrichter am Gleichspannungszwischenkreis: Funktion, Modulation und Regelung" [Self-comumutated converters on DC voltage intermediate circuit], Dec. 31, 2012 (Dec. 31, 2012), XP055598091, URL: https://ebookcentral.proquest.com/lib/epo-e-books/reader.action?docID=968673 [retrieved from the internet Jun. 19, 2019]—English summary.

*Primary Examiner* — Thai T Dinh
(74) *Attorney, Agent, or Firm* — Laurence A. Greenberg; Werner H. Stemer; Ralph E. Locher (57) ABSTRACT

A method for operating switching elements of an inverter of a vehicle that is driven by way of a three-phase synchronous machine. The inverter has a series circuit of switching elements for the phases. When the vehicle brakes, the synchronous machine is used to set a cycle rate for the operation of the switching elements depending on a frequency of AC phase currents of the synchronous machine. The electrical energy provided by the synchronous machine (Continued)

is fed to a DC voltage intermediate circuit. The cycle rate is set according to the frequency of the AC phase currents, such that it corresponds to the frequency of the respective AC phase currents of the synchronous machine. Zero points of the AC phase currents are determined, and the switching elements are operated to set a predefined phase difference between the respective AC phase current and a respectively associated AC phase voltage.

21 Claims, 4 Drawing Sheets

(56) References Cited

U.S. PATENT DOCUMENTS

| | | | |
|---|---|---|---|
| 8,148,925 B2* | 4/2012 | Jobard | B60L 7/003 |
| | | | 318/362 |
| 8,907,599 B2* | 12/2014 | Koral | H02P 3/12 |
| | | | 188/73.1 |
| 9,908,433 B2* | 3/2018 | Amler | B60L 15/007 |
| 2012/0043817 A1 | 2/2012 | Hartwig et al. | |

* cited by examiner

FIG 3

OPERATION OF SWITCHING ELEMENTS OF AN INVERTER OF AN IN PARTICULAR RAIL-BOUND VEHICLE DRIVEN BY WAY OF LEAST ONE AT LEAST THREE-PHASE SYNCHRONOUS MACHINE

BACKGROUND OF THE INVENTION

Field of the Invention

The invention relates to a method for operating switching elements of an inverter of an in particular rail-borne vehicle that is driven by means of at least one at least three-phase synchronous machine, wherein the inverter has for each of the phases of the synchronous machine at least one series connection that comprises the switching elements, in order to electrically couple the synchronous machine to a DC voltage intermediate circuit that is connected to the inverter, wherein when the vehicle is braked by means of the synchronous machine a clock-pulse rate for operating the switching elements is set in dependence upon a frequency of respective phase alternating currents that are provided by the synchronous machine with the result that electrical energy that is provided by the synchronous machine is supplied at least in part to the DC voltage intermediate circuit.

Furthermore, the invention relates to a method for braking an in particular rail-borne vehicle that is driven by means of at least one at least three-phase synchronous machine, wherein the synchronous machine is electrically coupled by way of an inverter, which has for each of the phases of the synchronous machine at least one series connection that comprises the switching elements, to a DC voltage intermediate circuit that is connected to the inverter, said method having the steps: specify a braking power for braking the vehicle, set a clock-pulse rate for operating the switching elements in dependence upon a frequency of respective phase alternating currents that are provided by the synchronous machine when the vehicle is braked by means of the synchronous machine with the result that electrical energy that is provided by the synchronous machine is supplied to the DC voltage intermediate circuit, and convert electrical energy, which is supplied by the synchronous machine to the DC voltage intermediate circuit when the vehicle is braked by means of the synchronous machine, into heat by means of an electrical resistance unit that is connected to the DC voltage intermediate circuit.

Furthermore, the invention relates to a clock-pulse generator for operating switching elements of an inverter of an in particular rail-borne vehicle that can be driven by means of at least one at least three-phase synchronous machine, wherein the inverter has for each of the phases of the at least one synchronous machine at least one series connection that comprises the switching elements in order to electrically couple the at least one synchronous machine to a DC voltage intermediate circuit that is connected to the inverter, wherein the clock-pulse generator is embodied so as, when the vehicle is braked by means of the synchronous machine, to set a clock-pulse rate for operating the switching elements in dependence upon a frequency of respective phase alternating currents that are provided by the synchronous machine, in order to supply at least in part to the DC voltage intermediate circuit electrical energy that is provided by the synchronous machine.

Finally, the invention also relates to an electrically drivable, in particular rail-borne vehicle having at least one at least three-phase synchronous machine for driving the vehicle in a driving operation, at least one DC voltage intermediate circuit, at least one inverter that is connected to the at least one DC voltage intermediate circuit and has for each of the phases of the at least one synchronous machine at least one series connection that comprises switching elements for connecting to a respective phase of the phases of the at least one synchronous machine, in order to electrically couple the at least one synchronous machine to the at least one DC voltage intermediate circuit, an electrical resistance unit that is connected to the at least one DC voltage intermediate circuit and is embodied so as at least when the vehicle is braked by means of the synchronous machine to convert into heat electrical energy that is supplied by said synchronous machine to the DC voltage intermediate circuit, and a clock-pulse generator for operating the switching elements of the at least one inverter, wherein the clock-pulse generator is embodied so as, when the vehicle is braked by means of the at least one synchronous machine, to set a clock-pulse rate for operating the switching elements in dependence upon a frequency of respective phase alternating currents that are provided by the at least one synchronous machine, in order to supply at least in part to the at least one DC voltage intermediate circuit electrical energy that is provided by the at least one synchronous machine.

Clock-pulse generators, electrically drivable, in particular rail-borne vehicles, methods for operating switching elements of an inverter and methods for braking in particular rail-borne vehicles by means of a three-phase synchronous machine are known extensively in this regard in the prior art with the result that it is not necessary to provide separate documentary evidence regarding them. Clock-pulse generators of the generic type serve so as to operate the switching elements of the inverter in a predeterminable manner in the switching operation with the result that it is possible to realize a desired energy conversion function by means of the inverter. Such inverters are meanwhile being used in numerous ways, for example also in vehicles that can be electrically driven, in that an electrical energy source that is connected to the DC voltage intermediate circuit provides electrical energy that is provided for the synchronous machine while the inverter is used in a predeterminable manner for a drive function of the vehicle.

Use of electrical drive facilities, in particular in the case of rail-borne vehicles that generally comprise the at least one synchronous machine and the inverter has proven its worth in the prior art for the usual drive functionality, in other words with regard to accelerating the vehicle or braking the vehicle or the like. It is thus possible for example to supply the electrical drive facility of the vehicle by means of an onboard energy source, for example a rechargeable battery or the like, with electrical energy for the intended driving operation of the vehicle. However, it is widespread particularly in the case of rail-borne vehicles to use an overhead line that is arranged above two rails of a track that are arranged essentially parallel to one another, said overhead line serving to supply electrical energy in the case of rail-borne vehicles. In this regard, a similar construction can naturally also be provided for electrically drivable motor vehicles that are not rail-borne. In this case, a track is a route for the rail-borne vehicle, whereby the vehicle is guided along the track.

Use in particular of clock-pulse generators or of generic methods is however not limited to use in the case of electrically drivable vehicles. It is furthermore also possible to use clock-pulse generators in numerous ways in the case of electrically drivable motor vehicles that are not rail-borne, in the case of electric drivetrains, in particular in the case of manufacturing facilities, production processes for goods and/or the like.

For the purpose of driving the vehicle, a synchronous machine is frequently used that is generally embodied in a three-phase manner. However, depending upon the application, it is also possible to provide that the synchronous machine has more than three phases, for example four phases, five phases or the like. The phases of the synchronous machine are connected to the inverter's series connections that comprise the switching elements, and the inverter is embodied accordingly adapted.

The inverter draws the electrical energy for the intended drive function from the energy source and provides this energy in a suitable form for the synchronous machine with the result that the desired drive function can be realized. The drive function can be for example accelerating the vehicle, braking the vehicle, setting a specific velocity and/or the like.

An inverter is a form of an energy converter that couples a DC voltage intermediate circuit to an AC voltage network with regard to energy technology with the result that electrical energy can be interchanged between the AC voltage network and the DC voltage intermediate circuit. For this purpose, it is generally provided that a series connection that comprises at least two switching elements is provided for a respective phase of the AC voltage network and said series connection is electrically coupled to the DC voltage intermediate circuit. The respective phase of the AC voltage network can be connected to center taps of the series connections. In the event that the DC voltage intermediate circuit is coupled to the synchronous machine by way of the inverter, respective phase connections of the synchronous machine, referred to in short as phases, are connected to the respective center taps of the series connections. By virtue of controlling the switching elements by the clock-pulse generator, the desired conversion function of the inverter can be realized with the result that the desired drive function of the synchronous machine can be realized. For this purpose, the switching elements are usually operated at a pre-determined clock-pulse rate that is considerably greater than a frequency of phase alternating currents of the synchronous machine. It is then possible by means of specific control methods such as pulse width modulation (PMW) or the like to produce the desired coupling with regard to energy technology. For this purpose, the clock-pulse generator provides specific switching signals for preferably each of the switching elements of the inverter with the result that the switching elements can be operated in the desired manner in the switching operation. By virtue of this operation of the switching elements, corresponding essentially square-wave phase voltages are provided at the center connections and used to influence the respective phase connections of the synchronous machine. As a result, the respective phase currents are produced, for example in dependence upon a degree of modulation. The frequency of the phase voltages in the case of such control methods is therefore considerably greater than the frequency of the phase currents. Such a control method is disclosed for example by Steffen Bernet in "Selbstgeführte Stromrichter am Gleichspannungszwischenkreis: Function, Modulation and Regelung", Springer Verlag Berlin Heidelberg 2012, DOI 1007/978-3-540-68861-7 2, [Self-commutated power converter on the DC voltage intermediate circuit: Function, Modulation and Regulation].

It is consequently possibly by virtue of suitable pulse patterns of the switching signals for the switching elements, which are provided by the clock-pulse generator, to accelerate, brake the vehicle or the like. When the vehicle is braked, the electrical energy that is provided by the synchronous machine can be supplied to the intermediate circuit, where it is then conveyed for example into a connected energy supply network or into a connected energy storage device or where appropriate also supplied in addition to a braking resistor in order to convert the energy at least in part into heat.

For reasons of operational safety, in particular during the intended driving operation, electrically drivable vehicles generally also have at least one mechanical braking facility that can be embodied for example as a friction brake or the like. This braking facility is inter alia also therefore necessary in order to ensure that in the event of a failure of the electrical energy supply or of the electrical energy sink during the braking procedure the vehicle can be braked safely or can be brought to a stop safely. The mechanical braking facility is therefore to be constructed accordingly. In actual fact, the electrical drive facilities have meanwhile proven to be so reliable that the mechanical braking facility is generally only now required to hold the vehicle in the stationary state. The mechanical braking facility is merely required in the case of rapid braking or also in the case of an emergency braking procedure.

For reasons of operational safety, it is nowadays provided that the mechanical braking facility not only has a simple and manageable construction but rather that its operating principle can also be realized in a simple manner. It is necessary especially in the case of rapid braking or also in the case of an emergency braking procedure to demonstrate the reliability of the safe braking procedure. This can be realized by the simple and manageable construction. In the case of electrical drive facilities of the prior art, this is very costly to realize and in certain circumstances not even possible. The mechanical braking facility is therefore also still required in the case of in particular rail-borne vehicles.

In addition, it has proven to be disadvantageous that the mechanical braking facility must be regularly maintained. The mechanical braking facility is very costly to maintain particularly if it is not available for operational safety.

However, in this regard the electrical drive facility or the synchronous machine that is driven by means of the inverter could also be used to reliably brake the vehicle. The procedure of controlling the switching elements by the clock-pulse generator renders it possible by means of which by the inverter and the synchronous machine that is connected thereto to set in a highly flexible manner the braking powers and consequently also the braking torques. However, it has proven to be disadvantageous that the procedure of controlling the inverter by the clock-pulse generator is extremely complex owing to numerous control variables that influence the switching signals and also owing to the internal signal processing processes. For this reason, it is only possible with great difficulty to provide evidence for a large error-free reliability in the case of rapid braking or in the case of emergency braking the vehicle. For this reason, the electrical drive facility of the vehicle is generally only used as an operational drive facility that is supplemented by the mechanical braking facility. In this sense, the publication DE 101 60 612 A1 discloses a traction drive having a traction power converter and a permanently excited synchronous machine. Moreover, the publication US 2012/0043817 A1 discloses a drive system for use with an insulated AC voltage network.

An electric brake for a synchronous machine is known from the publication WO 2016/107707 A1. For this purpose, the publication WO 2016/107707 A1 teaches that the synchronous machine is connected to a phase switching facility by means of which the phases of the synchronous machine are short-circuited in a first switching state and in a second switching state said phases can be connected to respective electrical resistors. It is possible by virtue of a duty cycle between these two operating states of the phase switching facility to set a resistance characteristic curve with the result that this produces a settable braking power and as a consequence also a corresponding settable braking torque.

Even if this doctrine has proven its worth, there still remains room for improvement. The doctrine of the publication WO 2016/107707 A1 is namely only suitable to a limited extent for the case of rapid braking or for the case of an emergency braking procedure. In addition, it is to be taken into consideration that the mechanical braking facility in the vehicle is not always sufficient in certain circumstances in order to be able to realize a safe braking effect for the case of rapid braking or for the case of the emergency braking procedure. It has proven to be disadvantageous in particular that the settable range for the braking power or for the braking torque is limited. In addition, the doctrine of the publication WO 2016/107707 A1 is only suitable for use in the case of an individual electric machine.

SUMMARY OF THE INVENTION

The object of the invention is to develop an electrical drive facility, which comprises a synchronous machine that is connected to a DC voltage intermediate circuit by way of an inverter, to the extent that the braking power or the braking torque for the braking procedure can be set in a highly flexible and simple manner. It is preferred that it is also to be possible to operate a plurality of electric machines on a common DC voltage intermediate circuit.

As a solution, the invention proposes methods, a clock-pulse generator and also an electrical drivable vehicle in accordance with the independent claims.

Advantageous embodiments are disclosed by the features of the dependent claims.

With respect to a generic method for operating switching elements of an inverter, it is proposed in particular that the clock-pulse rate is set according to the frequency of the phase alternating currents with the result that it fundamentally corresponds to the frequency of the respective phase alternating currents that are provided by the synchronous machine, wherein zero points or zero transitions of the phase alternating currents are determined and the switching elements are operated in such a manner that a predetermined phase difference is set between the respective phase alternating current of the phase alternating currents and a respectively allocated phase alternating voltage.

With respect to a method for braking a vehicle that is driven by means of at least one at least three-phase synchronous machine, it is proposed in particular that the switching elements are operated in accordance with the method in accordance with the invention, wherein a phase difference between the respective phase alternating current of the phase alternating currents and a respectively allocated phase alternating voltage is set in dependence upon a braking power.

With respect to a generic clock-pulse generator, it is proposed in particular that the clock-pulse generator is embodied so as to set the clock-pulse rate according to the frequency of the phase alternating currents with the result that it fundamentally corresponds to the frequency of the respective phase alternating currents that are provided by the synchronous machine, to determine zero points of the phase alternating currents and to operate the switching elements in such a manner that a predetermined phase difference is set between the respective phase alternating current of the phase alternating currents and a respectively allocated phase alternating voltage.

With regard to a generic electrically drivable vehicle, it is proposed in particular that the clock-pulse generator is embodied in accordance with the invention and furthermore is embodied so as to set a phase difference between the respective phase alternating current of the phase alternating currents and a respectively allocated phase alternating voltage in dependence upon a predeterminable braking power.

The invention is based on the fact that by means of the drive facility that comprises at least the at least one inverter and the at least one synchronous machine in conjunction with the resistance unit it is possible to brake the vehicle even for the case of rapid braking or for the case of an emergency braking procedure. The inverter and the resistance unit are electrically coupled to one another in this case by way of the DC voltage intermediate circuit. Alternatively or in addition to the resistance unit, it is naturally also possible to provide a correspondingly suitable energy storage unit that is embodied to receive and store the electrical energy that is generated while the vehicle is being braked. However, it is generally expedient to use at this juncture the resistance unit especially if large quantities of energy are generated during a short time period.

While the braking power or the braking torque is being provided by the at least one synchronous machine, it is generally provided to electrically separate the electrical energy source for the intended driving operation of the vehicle from the DC voltage intermediate circuit while the vehicle is being braked. This provides the possibility to avoid undesired effects of the electrical energy source, for example of an energy supply network or the like, that can possibly interfere with the braking procedure. In the case of a rail-borne vehicle that is generally supplied with electrical energy from the energy supply network by way of an overhead line and that comprises a network power inverter or a rectifier for coupling the overhead line to the DC voltage intermediate circuit, these units are electrically separated from one another at least during the braking procedure. This separation procedure can be realized by means of a switching element, for example an electrical contactor or the like.

By virtue of operating the switching elements at a clock-pulse rate that is dependent at least during the braking procedure upon the phase alternating currents that are provided by the at least one synchronous machine, in particular if said clock-pulse rate corresponds to said phase alternating currents, it is possible to influence the electrical power that is output by the at least one synchronous machine. Said electrical power can be influenced by virtue of the fact that a phase difference that is dependent upon the braking power is set between the respective phase alternating current of the phase alternating currents of the at least one synchronous machine and the respectively allocated phase alternating voltage. The phase difference deviates—for example depending upon the polarity convention for the voltages and/or the currents—in particular from zero or 180°. As a consequence, it is possible to be able to set a reduction or also an increase in the electrical power that is output by the at least one synchronous machine according to the predetermined braking power, which is not possible or only possible to a very limited extent in the case of the prior art by virtue of rectifying the phase alternating currents that are provided by the at least one synchronous machine. In this case, a phase difference is in particular therefore not provided because in the case of normal rectifiers said phase difference can be set accordingly freely and automatically and can also not be changed.

The invention therefore renders it possible to considerably increase the flexibility with regard to the braking power or the braking torque, this is because it is possible for example with the aid of a predetermined braking power to predetermine accordingly the phase difference. In this case, use is made of the knowledge that the braking power that is provided by the synchronous machine is dependent upon the predetermined phase shift. The provided braking power can therefore be both greater and also less than in the case of the prior art, as a result of which it is not only possible to realize a considerably improved adjustability but rather it is also possible to realize an improved optimization of a braking procedure, in particular with regard to slip and/or the like. For this purpose, the clock-pulse generator for example can comprise a braking power control unit that has an input connection for a braking power signal or a braking torque signal of a superordinate vehicle controller and that in dependence upon this braking power signal or braking torque signal predetermines a phase signal for a phase shift that is to be set. The clock-pulse generator can then provide the switching signals in addition in dependence upon the phase signal.

In this case, the invention uses the concept that the phase alternating voltages of the at least one synchronous machine can be influenced with respect to the value of its amplitude with the result that it is also possible in dependence thereon to vary the intermediate circuit voltage as required. This renders it possible using the resistance unit also in a highly flexible manner to convert into heat in a suitable manner the power that is supplied to the DC voltage intermediate circuit by the at least one synchronous machine. With regard to converting the power into heat, it is therefore possible using the invention to considerably increase the settable range with the result that the invention can be used in particular for the case of rapid braking or for the case of an emergency braking procedure.

At the same time, the invention renders it possible by virtue of predetermining the braking power or the braking torque to considerably improve the emergency braking procedure or the rapid braking procedure, the reason being that it is possible to realize namely a maximal braking effect with regard to the vehicle, wherein at the same time while using a corresponding anti-slip control it is possible to realize a particularly rapid acting and reliable braking of the vehicle in the case of different boundary conditions with regard to a mechanical coupling between wheels of the vehicle and a route. In addition, it is also possible using the invention to react in a simple manner to an adjustment of a maximal possible braking power or a maximal possible braking torque, in that the maximal possible braking power or the maximal possible braking torque is adjusted in a suitable manner as a predetermined braking power or predetermined braking torque during the braking procedure. It is hereby rendered possible to realize a particularly rapid braking procedure over a very short path for the case of rapid braking or an emergency braking procedure.

Differently to the publication WO 2016/107707 A1, it is therefore possible using the invention also to realize a braking power or a braking torque that is considerably greater than the braking power or braking torque that can be realized using the invention disclosed in WO 2016/107707 A1. In this case, the invention renders it possible to be able to realize this whilst incurring only a small outlay with regard to the control. It is only hereby that the electrical drive facility that is already provided in the vehicle is suitable for possible use in the case of an emergency braking procedure or in the case of a rapid braking procedure.

The invention therefore does not relate to the usual intended driving operation in which it is provided to accelerate, brake the vehicle or operate the vehicle at a predetermined velocity but rather the invention relates in particular to rendering possible a rapid braking or emergency braking of the vehicle and in fact preferably whilst to a great extent avoiding the mechanical braking facility that is usual in the prior art. This renders it possible to reduce or even forego the mechanical braking facility.

A switching element in the sense of this disclosure is in this case preferably a controllable electronic switching element, for example a controllable electronic semiconductor switch such as a transistor that is operated in a switching operation, a thyristor, combination circuits thereof, preferably with parallel connected inverse diodes, a gate turn-off thyristor (GTO), an insulated-gate bipolar transistor (IGBT), combinations thereof or the like. In this regard, the switching element can however also be formed by a field effect transistor, in particular a metal oxide semiconductor field-effect transistor (MOSFET).

So as to provide the desired energy conversion functionality by the inverter, the switching elements are operated in the switching operation. With regard to a semiconductor switch whilst using a transistor, the switching operation means that in a switched-on switching state a very small electrical resistance is provided between the connections of the transistor that form the switching path with the result that it is possible to realize a high current flow in the case of a very small residual voltage. On the other hand, in the switched-off switching state, the switching path of the transistor is high-resistance, in other words it provides a high electrical resistance with the result that even in the case of a high electrical voltage that prevails at the switching path there is essentially no current flow or only a very small, in particular negligible current flow. A linear operation in the case of transistors differs therefrom, but said linear operation is generally not used in the case of invertors of the generic type.

So as to realize the control functionality, the switching elements have in each case at least one control connection at which they can be influenced by the switching signals that are provided by the clock-pulse generator with the result that the desired switching function of the switching element can be realized. The switching signal can be a binary switching signal that can assume two state values in order to be able to provide the desired switching functions of the switching elements. For example, the switching signal can be formed by a sequence of pulses by means of which the control connection is influenced. This is above all expedient in the case of thyristors or GTO. Furthermore, it is possible in the case of transistors to provide that the switching signal is a square wave signal, wherein a respective switching state of the switching element can be allocated to one of the potentials of the square wave signal. Such a signal is for example expedient for transistors, in particular for bipolar transistors, field-effect transistors or the like.

The clock-pulse generator provides the functionality so as to generate the switching signals. Also further functions, in particular with regard to the inverter, can be realized by the clock-pulse generator, for example monitoring functions, safety-related functions and/or the like. For this purpose, the clock-pulse generator can comprise a hardware circuit and/or a program-controlled computer unit or the like. Naturally, the clock-pulse generator can be embodied as a separate assembly. The clock-pulse generator can however also be encompassed at least in part by a superordinate vehicle control facility of the vehicle.

The at least one inverter is an electronic hardware circuit that has the series connections that preferably comprise in each case two switching elements according to the number of phases of the at least one synchronous machine. The series connections are generally connected in parallel to the at least one DC voltage intermediate circuit. However, in alternative embodiments, it is also possible to provide that some of the series connections are also connected to separate DC voltage intermediate circuits. Respective center taps of the series connections provide connections to which it is possible to connect respective phase connections of the phases of the at least one synchronous machine. By virtue of suitable pulse patterns of the switching signals so as to switch the switching elements, it is possible to realize the desired coupling with regard to energy technology between the DC voltage intermediate circuit and the at least one synchronous machine. The fundamental operating methods in this regard are in this case known and for this reason no further statement is made with respect thereto. For the intended driving operation, generally the clock-pulse rate of the switching signals is considerably greater than the frequency of the phase alternating currents of the at least one synchronous machine. If the vehicle is braked in accordance with the invention, the clock-pulse rate is changed as quickly as possible with the result that the clock-pulse rate preferably corresponds essentially to the frequency of the phase alternating currents of the at least one synchronous machine.

The synchronous machine is an electric machine that is preferably configured at least for a three-phase operation. However, in the case of specific applications, it is also possible to provide that the synchronous machine has more than three phases. The synchronous machine is preferably a permanently excited synchronous machine. However, it can also be embodied as an externally excited synchronous machine or the like. Naturally, combinations thereof can also be provided in order to be able to realize for example specific control possibilities aiming to influence the magnetic flux.

The vehicle can be embodied as a rail-borne vehicle or also as a motor vehicle. It is preferred that the vehicle comprises an electrical drive facility that has at least one synchronous machine. If a plurality of synchronous machines is provided, a dedicated inverter is preferably provided for each of the synchronous machines. Furthermore, it is also possible to provide dedicated DC voltage intermediate circuits for the synchronous machines. Moreover, it is possible to provide that in the case of a plurality of synchronous machines the inverters are connected to a common DC voltage circuit.

The clock-pulse rate corresponds to a frequency with which the switching signals for the switching elements are provided by the clock-pulse generator. In this case, it is possible to provide that a pulse provides a switched-on time period and a switched-off time period for controlling an individual switching element synchronized with the clock-pulse rate. It is therefore preferably provided for the procedure of braking the vehicle that the clock-pulse rate preferably corresponds to the frequency of the phase alternating currents that are provided by the at least one synchronous machine. It is therefore also not necessary for the operation of the braking procedure for the clock-pulse rate to have a constant frequency but rather said clock-pulse rate is preferably directly dependent upon the frequency of the phase alternating currents of the at least one synchronous machine.

As a result of this, the clock-pulse rate can in particular naturally also be dependent upon an instantaneous rotational speed of a rotor shaft of the at least one synchronous machine.

In order to be able to determine the zero points of the phase alternating currents, current sensors for example are provided that are connected to the clock-pulse generator or to a superordinate controller that is connected thereto. By virtue of a suitable evaluation of the sensor signals of the current sensors, it is then possible to determine the zero points of the corresponding phase alternating currents.

The phase difference corresponds to a time period that occurs between a zero point of the phase alternating current and a zero point of the phase alternating voltage. Since alternating currents that are at equidistant time intervals are generally involved in the case of three phase or multi-phase networks, the time period can generally be specified as an angle that is the same size for all the phases. The phase difference consequently corresponds to an angle between the respective phase alternating current of the phase alternating currents and the respectively allocated phase alternating voltage of the phase alternating voltages.

In order now to set the phase difference, the switching elements are accordingly controlled offset at staggered time intervals with respect to the determined zero points of the phase alternating currents. As a consequence, it possible to control the respective phase alternating voltage of the phase alternating voltages in such a manner that its zero points lies about a predetermined angle or time period, namely the phase difference, before the zero point of the respective phase alternating current or also after said zero point. The phase shift is therefore either positive or negative with regard to the phase alternating currents. In order to be able to increase the braking power, a phase-delayed phase alternating voltage is to be set, in other words the phase difference is negative. If on the other hand a reduced braking power is desired, a leading-phase phase alternating voltage is to be set with the result that a positive phase difference is set.

It is obvious from this how in a simple manner the power can be set during the braking procedure, in other words the braking power and consequently also the braking torque. In this case, it has proven to be advantageous that it is not necessary in this regard to provide a complex regulator or controller so as to implement the braking procedure. As a consequence, it is also possible to meet the requirements with respect to the operational safety in a simple manner and/or to verify this. It is also possible using the invention to realize a reliable safe rapid braking procedure or emergency braking procedure without a mechanical braking facility.

In order to be able to realize a wide as possible reliable adjustment range for use in accordance with the invention, it is moreover advantageous if the DC voltage intermediate circuit is not electrically coupled to a further energy source. In the case of a rail-borne vehicle, the energy source can for example be supplied with energy by means of an overhead line or the like. However, the energy source can also comprise an electrical energy storage device, for example a rechargeable battery or the like, that is arranged for example on the vehicle. The energy source is preferably decoupled from the DC voltage intermediate circuit in that said energy source is electrically separated from the DC voltage intermediate circuit by means of a switching facility. The switching unit can be formed by an electrical contactor or the like. An intermediate circuit DC voltage of the DC voltage intermediate circuit is consequently no longer dependent upon the energy source, in particular no longer determined by the energy source, and can therefore be set as required for the braking procedure. As a consequence, it is possible to set the intermediate circuit DC voltage at the DC voltage intermediate circuit in an optimized manner for the braking procedure with the result that the desired power conversion can be realized and as a result also the desired energy sink in a highly flexible manner.

The clock-pulse rate is set according to the frequency of the phase alternating currents. In this case, the clock-pulse rate therefore has approximately the same frequency as the phase alternating currents. It is preferred that the clock-pulse rate is set during the braking procedure according to the prevailing or instantaneous frequency of the phase alternating currents. It is hereby possible in a simple manner to take into consideration changes in the rotational speed of the rotor of the at least one synchronous machine. It is preferred that the clock-pulse rate consequently corresponds essentially to the frequency of the respective phase alternating currents that are provided by the synchronous machine.

In accordance with one advantageous development, it is proposed that only the switching elements that are directly coupled to the same one of two intermediate circuit potentials of the DC voltage intermediate circuit are activated at least in part simultaneously. It is hereby possible to activate only the switching elements of the respective series connections of the at least one inverter that are directly electrically coupled to the same intermediate circuit potential. The relevant switching elements can be activated essentially simultaneously. However, it is also possible to provide that the switching elements are not activated simultaneously but rather that they are only activated at least simultaneously during a predeterminable time period. It follows from this that the same switching time points do not necessarily have to be provided for all relevant switching elements. This development can be used to render it possible to short circuit the phases of the at least one synchronous machine for this predeterminable time period and in fact preferably by way of the respectively used intermediate circuit potential. As a consequence, it is possible to realize further flexibility with respect to use of the invention. It is possible in this manner to reliably realize a high braking power or a high braking torque particularly in the case of low rotational speeds of the rotor of the at least one synchronous machine.

In addition, it is possible to provide that the intermediate circuit potential is selected in dependence upon an instantaneous phase position of the phase alternating currents. It is thus possible to provide to select the one intermediate circuit potential of the intermediate circuit potentials for which the at least one of the switching elements of the series connections must be actively switched on. It is naturally also possible to use further criteria in order to select the suitable intermediate circuit potential. It is moreover possible to provide that the suitable intermediate circuit potential is changed as required in order to be able to realize predetermined boundary conditions in a particularly favorable manner. The change can be dependent upon how instantaneous phase positions of the phase alternating currents change. It is possible to take into consideration in particular which operating mode the synchronous machine is being operated in, for example whether said synchronous machine is being operated in a generator mode or a motor mode. It is thus possible for example in a three-phase case that if two phase currents influence the same intermediate circuit potential in the same flow direction, the switching elements that are connected directly to this intermediate circuit potential are activated.

In accordance with one development, it is proposed that the predetermined phase difference is determined in dependence upon an instantaneous intermediate circuit voltage of the DC voltage intermediate circuit. This can take into consideration the fact that the intermediate circuit DC voltage should have a correspondingly allocated voltage value for providing a predetermined braking power. In order to be able to realize this, it is possible to provide a value for the intermediate circuit voltage. Furthermore, the value of the intermediate circuit DC voltage can naturally also be dependent upon the manner in which the resistance unit is to be influenced with an electrical voltage in order to convert the supplied electrical energy into heat. This development can naturally also be combined in combination with the above described embodiments. For example, it is possible in the case of an intermediate circuit DC voltage, the value of which is approximately a rated voltage of the DC voltage intermediate circuit, to provide that the phase shift is selected small in order to avoid a voltage overload of the DC voltage intermediate circuit. If on the other hand the value of the intermediate circuit DC voltage is considerably less than the rated voltage, it is possible to provide that a higher value can be predetermined for the phase shift because a corresponding voltage reserve is provided with regard to the rated voltage. Further conditions can be taken into consideration accordingly.

With regard to the procedure of braking the vehicle, it is in particular proposed that the phase difference is predetermined moreover in dependence upon a prevailing rotational speed of the synchronous machine. This can take into consideration the fact that the phase difference that leads to it being possible to set a predetermined braking power or a predetermined braking torque can be dependent upon which rotational speed of the rotor the at least one synchronous machine is currently or instantaneously being operated at. It is possible hereby to take into consideration specific characteristics of the at least one synchronous machine and/or also characteristics of a maximal instantaneously possible braking torque. It is possible to take into consideration for example the fact that the maximal possible braking torque can be dependent upon a velocity of the vehicle. Overall, it is possible to further improve the flexibility and the reliability.

Furthermore, it is proposed that the predetermined braking power is determined in dependence upon an instantaneously maximal possible braking power. This embodiment renders it possible to realize an anti-slip control in order to be able to realize a short as possible braking path when the vehicle is braked. Furthermore, further boundary conditions or aspects can also be used to determine the predetermined braking power. For example, it is also possible to take into consideration aspects with regard to the vehicle itself that provide a braking procedure with a maximal possible braking power or a maximal possible braking torque in order for example to ensure a stability of the vehicle during the driving operation in a sufficiently reliable manner, for example when negotiating a bend or the like. It follows from this that the instantaneously maximal possible braking power is not a predeterminable braking power but rather on the contrary is a braking power that is produced on account of the operating conditions. Thus, the instantaneously maximal possible braking power is for example a maximal braking power that can be realized with the braking of the vehicle under currently prevailing operating conditions, for example on account of environmental conditions such as moisture, heat, coefficients of friction and/or the like. The instantaneously maximal possible braking power can be determined by means of a dedicated determining facility, for example within the scope of an anti-slip system, an anti-blocking system or the like.

Further advantages and features are disclosed with the aid of the following description of exemplary embodiments with the aid of the attached figures. In the figures, like reference numerals describe like features and functions.

DETAILED DESCRIPTION OF THE INVENTION

Figure 1:
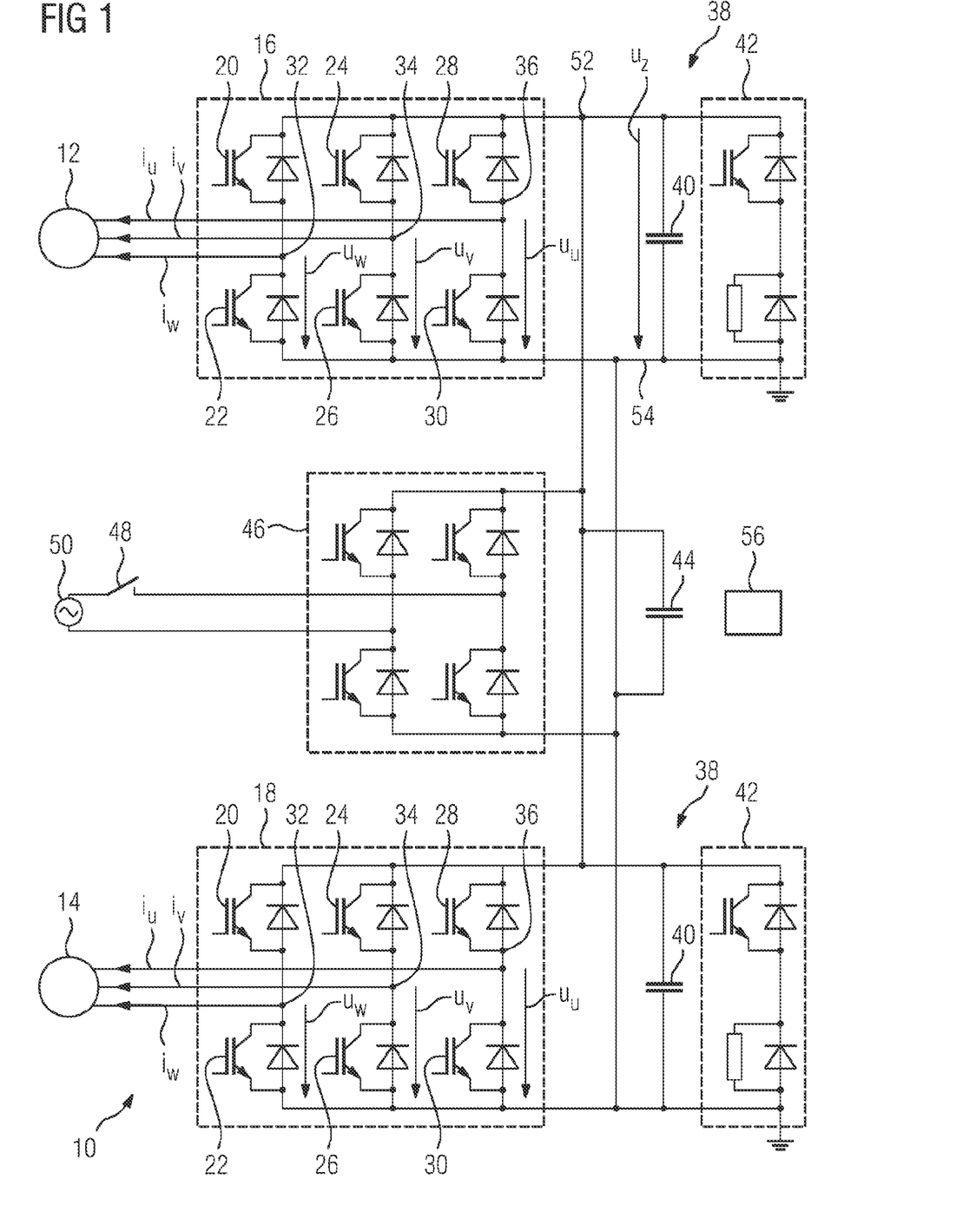
FIG. 1 shows a schematic reduced view of a circuit diagram of a drive facility of an electrically drivable rail-borne vehicle.

FIG. 1 illustrates in a reduced schematic view of a circuit diagram the construction of an electrical facility of an electrically drivable rail-borne vehicle 10 that is not further illustrated. The vehicle 10 comprises in the present case two three-phase synchronous machines 12, 14 that serve to drive the vehicle 10 in a driving operation. For this purpose, rotors (not illustrated) of the synchronous machines 12, 14 are mechanically coupled to corresponding drive axles of the vehicle 10 that are likewise not illustrated.

The vehicle 10 comprises moreover a DC voltage intermediate circuit 38 and two inverters 16, 18 that are connected to the DC voltage intermediate circuit 38, wherein the synchronous machine 12 is connected to the inverter 16 and the synchronous machine 14 is connected to the inverter 18. Each of the inverters 16, 18 has for each of the phases U1, V1, W1 of the synchronous machines 12, 14 a respective series connection that comprises switching elements 20, 22, 24, 26, 28, 30 that serve to connect the respective phases U1, V1, W1 of the respective synchronous machine 12, 14 to the respective center taps 32, 34, 36 of the series connections. The synchronous machines 12, 14 are hereby electrically coupled to the DC voltage intermediate circuit 38.

The DC voltage intermediate circuit 38 is influenced by an intermediate circuit DC voltage $u_z$ that comprises electrical intermediate circuit potentials 52, 54.

Moreover, two electrical resistance units 42 are connected to the DC voltage intermediate circuit 38, said electrical resistance units being embodied so as when the vehicle 10 is braked by means of the synchronous machines 12, 14 to convert into heat electrical energy that is supplied to the DC voltage intermediate circuit 38 by said synchronous machines. The resistance units 42 can comprise an electrical resistor that is embodied accordingly with respect to its capacity and can be electrically coupled as required to the DC voltage intermediate circuit by means of a switching element, not further illustrated, in order to control the power consumption. In FIG. 1, the switching element is formed by an IGBT that is not illustrated and is operated in a suitable manner in the switching operation by a clock-pulse generator 56 that will be described below. Moreover, an inverse diode is connected in parallel directly to the resistor of the resistance unit 42, said inverse diode serving to provide a freewheel path in order to be able to compensate the effect of parasitic inductivities or the like.

Moreover, the DC voltage intermediate circuit 38 comprises two intermediate circuit capacitors 40 that support the operation of the inverters 16, 18 and where appropriate can also be configured for further supporting functionalities.

Furthermore, the vehicle 10 comprises the clock-pulse generator 56 that serves to operate the switching elements 20, 22, 24, 26, 28, 30 of the respective inverter of the inverters 16, 18. The clock-pulse generator 56 is embodied so as to control the switching elements 20, 22, 24, 26, 28, 30 by means of corresponding switching signals during an intended driving operation. In this case, a clock-pulse rate for the switching signals for the intended driving operation is considerably greater than a frequency of the phase currents of the two synchronous machines 12, 14. In this case, the clock-pulse rate can be for example greater than approx. 5 kHz, for example approx. 10 kHz.

The procedure of braking the vehicle 10 is in this case not attributed to the intended driving operation. The braking procedure relates in the present case in particular to a rapid braking procedure or to an emergency braking procedure. In order to brake the vehicle 10 by means of the synchronous machines 12, 14, a clock-pulse rate for operating the switching elements 20, 22, 24, 26, 28, 30 is set in dependence upon a frequency of phase alternating currents $i_u$, $i_v$, $i_x$, that are provided by the synchronous machines 12, 14 in order to supply the electrical energy, which is provided by the synchronous machines 12, 14, at least in part to the DC voltage intermediate circuit 38 and as a consequence also to the resistance unit 42. This clock-pulse rate corresponds in the present case to the frequency of the phase alternating currents $i_u$, $i_v$, $i_x$, and can be for example in a frequency range of approx. less than 500 Hz.

The clock-pulse generator 56 consequently serves inter alia to operate the switching elements 20, 22, 24, 26, 28, 30 of the inverters 16, 18. As will be further explained below, the clock-pulse generator 56 is embodied so as to determine the zero points of the phase alternating currents $i_u$, $i_v$, $i_w$ and to operate the switching elements 20, 22, 24, 26, 28, 30 in such a manner that a predetermined phase difference is set between the respective phase alternating current of the phase alternating currents $i_u$, $i_v$, $i_w$ and a respectively allocated phase alternating voltage $u_u$, $u_v$, $u_w$. Furthermore, the clock-pulse generator 56 is embodied so as to set the phase difference between the respective phase alternating current of the phase alternating currents $i_u$, $i_v$, $i_w$ and the respectively allocated phase alternating voltage $u_u$, $u_v$, $u_w$ in dependence upon a predeterminable braking power or a predeterminable braking torque. The phase alternating voltages $u_u$, $u_v$, $u_w$ are selected in the present case with regard to the intermediate circuit potential 54. However, in this case a specific reference potential for the phase alternating voltages $u_u$, $u_v$, $u_w$ is not important for the illustration of the invention.

The predeterminable braking power or the predeterminable braking torque is provided by a superordinate vehicle controller of the vehicle 10 that is not illustrated in the present case in the figure. The vehicle controller of the vehicle 10 serves in particular to drive or operate the vehicle 10 in an intended driving operation. The intended driving operation comprises in the present case at least one procedure of accelerating, braking, driving the vehicle 10 at a predetermined velocity or the like.

In order to be able by means of the synchronous machines 12, 14 to realize a braking procedure for the case of rapid braking or for the case of an emergency braking, it is provided that the braking power is provided accordingly by the superordinate vehicle controller. In this case, the braking power is provided in such a manner that an instantaneously maximal possible braking power is provided as a predetermined braking power. This maximal possible instantaneous braking power can vary from time to time and be dependent for example on a velocity of the vehicle 10, weather conditions with regard to a route and/or the like. The maximal possible instantaneous braking power is consequently in the present embodiment dependent upon whether a short as possible braking distance can be realized, for which purpose the superordinate vehicle controller also comprises an anti-slip control. The maximal possible instantaneous braking power is determined in dependence upon this.

Figure 2:
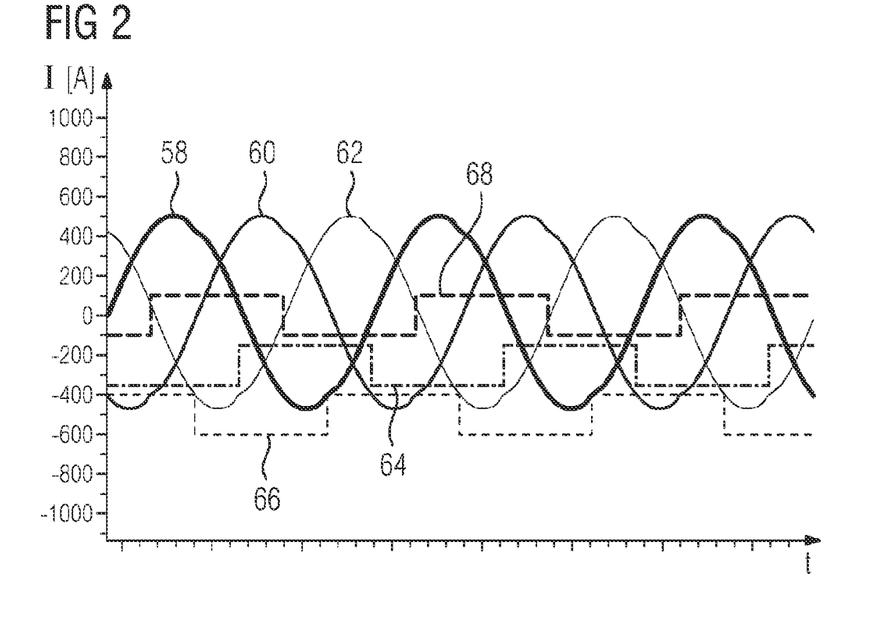
FIG. 2 shows a schematic diagram representation of phase currents and allocated phase voltages of a three-phase synchronous machine on an inverter in accordance with FIG. 1 in a braking procedure.

In the intended driving operation, the switching elements 20, 22, 24, 26, 28, 30 are controlled in a suitable manner by means of the clock-pulse generator 56 with the result that it is possible to realize the desired functionality with regard to driving the vehicle. If on the other hand the vehicle 10 is braked, the clock-pulse rate for operating the switching elements 20, 22, 24, 26, 28, 30 is set according to the frequency of the phase alternating currents $i_u$, $i_v$, $i_x$, that are provided by the synchronous machines 12, 14, in other words the clock-pulse rate is different to that set in the case of the intended driving operation. This is apparent with the aid of FIG. 2 which illustrates a schematic diagram representation in which the phase alternating currents $i_u$, $i_v$, $i_x$, are illustrated by means of the graphs 58, 60, 62, wherein the phase currents $i_u$, $i_v$, $i_x$, are allocated according to the graphs. An ordinate of the diagram in accordance with FIG. 2 is consequently allocated to a current in amps, whereas an abscissa of the diagram is allocated to the time in seconds. In the illustration in FIG. 2, the frequency of the phase alternating currents $i_u$, $i_v$, $i_w$ is approx. 285 Hz.

Moreover, it is apparent in FIG. 1 that the DC voltage intermediate circuit 38 is electrically coupled to a network inverter 46 that is not further explained here. An intermediate circuit capacitor 44 is allocated to the network inverter 46. The network inverter 46 represents a coupling with regard to energy technology to an AC voltage source 50 as an energy source for the intended driving operation. The AC voltage source 50 is electrically coupled by way of an electrical contactor 48 to the network inverter 46. During the intended driving operation, the electrical contactor 48 is in the switched-on switching state with the result that it is possible to switch between the DC voltage intermediate circuit 38 and the AC voltage source 50. However, when the vehicle 10 is braked, the electrical contactor 48 is in the switched-off switching state. The switched-off switching state can also then be provided for the contact 48 if the vehicle 10 is outside the intended driving operation, for example in a parked state or the like.

Moreover, FIG. 2 illustrates corresponding phase voltages $u_u$, $u_v$, $u_w$ by means of graphs 64, 66, 68, however said phase voltages are only illustrated here schematically superimposed and offset with respect to one another in order to be able to visualize in a diagram the temporal position with respect to one another. The amplitudes of the voltages are therefore not illustrated in FIG. 2 in a true-to-scale manner. As is apparent in FIG. 2 with the aid of the graphs 58 to 68, the phase currents $i_u$, $i_v$, $i_w$ and the corresponding allocated phase voltages $u_u$, $u_v$, $u_w$ are temporally synchronous with one another, with the result that a phase shift between the phase currents and the allocated phase voltages is approx. zero. In the case of this operating event, the electrical energy that is provided by the synchronous machines 12, 14 is supplied by means of the inverters 16, 18 only rectified to the DC voltage intermediate circuit 38 with the result that this energy can be converted into heat by means of the resistance units 42. As will be demonstrated with the aid of FIG. 5, the braking effect that can be realized hereby is however limited with the result that it is generally not suitable for the case of rapid braking or for the case of the emergency braking procedure.

The phase voltages $u_u$, $u_v$, $u_w$ are available at the center taps 32, 34, 36 of the series connections of the inverters 16, 18 and can be detected by means of suitable voltage sensors. The voltage sensors can be encompassed by the inverters 16, 18. Corresponding sensor signals are transmitted to the clock-pulse generator 56 in the present case.

Figure 3:
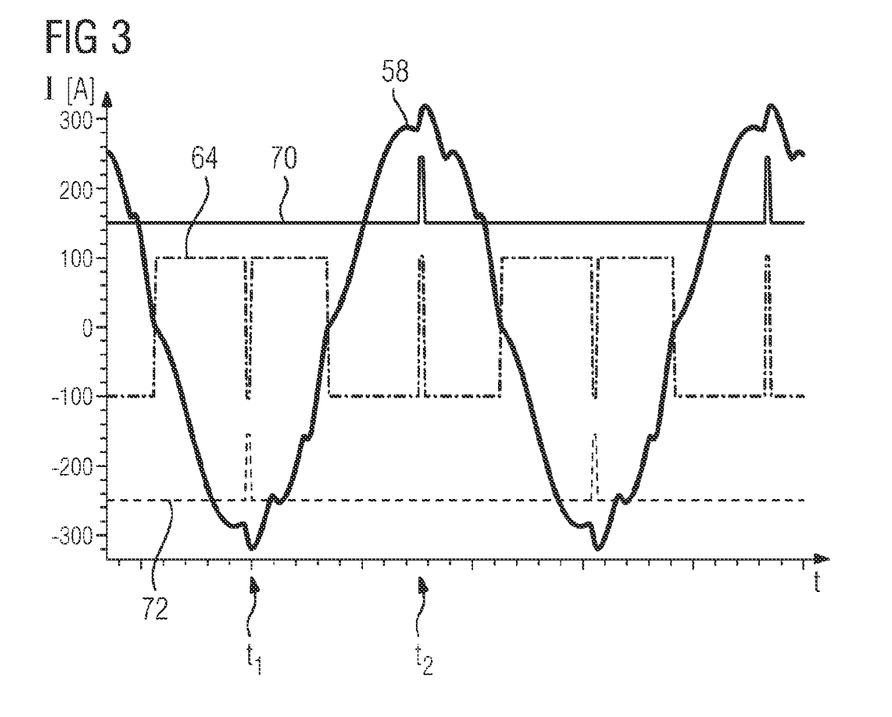
FIG. 3 shows a schematic diagram representation as in FIG. 2 but in this case only for a single phase of the phases of the synchronous machine by means of graphs illustrating how a change is made between a short-circuit of phase connections of the synchronous machine and supplying energy into the DC voltage intermediate circuit in accordance with FIG. 1.

FIG. 3 illustrates in a schematic diagram representation as in FIG. 2 a development of the control possibility with regard to braking the vehicle 10 for a single phase of the phases, namely the phase U1. This applies accordingly for the phases V1 and W1. The frequency in this case is likewise again approx. 285 Hz. It is apparent with the aid of FIG. 3 that in the region of the maximal amplitude of the phase current $i_u$ at a time point $t_1$ a corresponding switching element of the switching elements, namely the switching element 22, is switched on for a short period of time. The corresponding phase voltage $u_u$ is again illustrated by the graph 64, wherein the corresponding phase current $i_u$ is illustrated by means of the graph 58. The phase voltage $u_u$ is illustrated merely schematically with respect to its amplitude.

Corresponding control signals of the semiconductor switch 20, 22 are illustrated by means of graphs 70, 72 in order to display a respective switching. The graphs 70, 72 are not plotted true-to-scale with respect to the ordinate in the diagram of FIG. 2 in order to represent the temporal arrangement in a simplified manner. It is apparent that in a time range around the time point $t_1$, at which the amplitude of the phase current $i_u$ realizes its maximal negative value, the switching element 22 is switched on for a short moment. The corresponding switching element 20 remains in this case switched off. For the positive maximal amplitude of the phase current $i_u$, a corresponding switching occurs in a time range about the time point $t_2$ at which, as illustrated with the aid of the graph 70, the switching element 20 is switched on for a short time period. In this case, the switching element 22 now remains in the switched-off state. As a consequence, it is possible in contrast to the function in accordance with FIG. 2 to realize that the braking procedure that is illustrated in accordance with FIG. 2 can be varied with respect to the braking effect in that the braking effect can be reduced. Although this is suitable for a normal braking operation of the vehicle 10, this functionality is however not sufficient in order to be used for the rapid braking procedure or for the emergency braking procedure.

Figure 4:
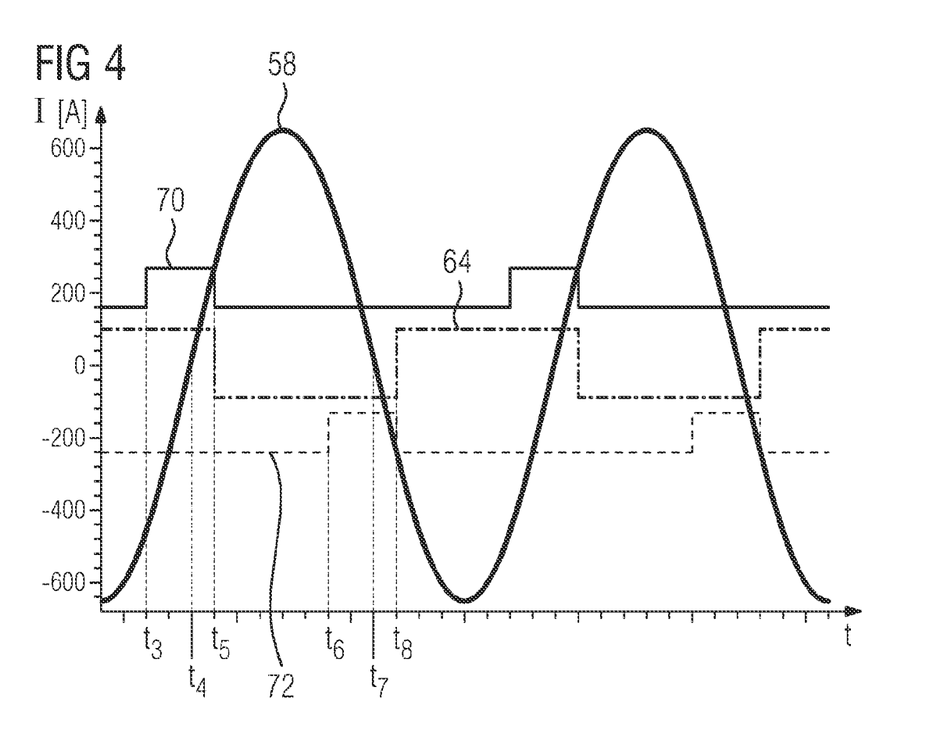
FIG. 4 shows a schematic diagram representation as in FIG. 3 for a single phase of the synchronous machine in accordance with FIG. 1 during the braking procedure, wherein, by means of voltage signals that are illustrated in a time-synchronized superimposed manner for the switching elements of the allocated series connection of the inverter, a phase shift between a phase alternating current and an allocated phase alternating current is illustrated.

FIG. 4 now illustrates in a schematic diagram representation, as in FIG. 3 for the event that is illustrated in FIG. 3, how an enhanced braking effect can be realized by means of setting a phase difference between the phase alternating currents $i_u$, $i_v$, $i_w$ and the allocated phase voltages $u_u$, $u_v$, $u_w$. FIG. 4 illustrates the situation for a phase-delayed phase voltage that describes situations that are explained with regard to increasing the braking power compared with situations previously described with the aid of FIGS. 2 and 3.

It is apparent that the graphs 70 and 72 represent corresponding control signals for the switching elements 20, 22. In this case, zero points of the phase current $i_u$ will now be determined initially by means of the clock-pulse generator 56 and the clock-pulse generator 56 has for this purpose an appropriate evaluating unit that are connected to the current sensors (not illustrated). The switching time points $t_3$ and $t_5$ are then determined from the determined zero points of the phase current $i_u$, said switching time points representing a switching time period for a switched-on switching state of the switching element 20. The switching time period includes a time point $t_4$ at which the phase current $i_u$ is zero.

When the switching element 20 is switched off, the phase voltage $u_u$ that is illustrated by the graph 64 then jumps from its maximal value to its minimal value. The time period between the time points $t_4$ and $t_5$ corresponds to the phase shift or the phase difference between the phase current $i_u$ and the allocated phase voltage $u_u$. This phase difference is negative in the present case with the result that it is possible to realize an increased braking power. In an equivalent manner for the second zero point of the phase current $i_u$ at the time point $t_7$, a control signal for the switching element 22 is illustrated in accordance with the graph 72. In a corresponding manner, a switched-on time period is determined that is formed by the time points $t_6$ and $t_8$. A time difference between the time points $t_8$ and $t_7$ is now again a measurement for the phase difference. The phase difference is in this case essentially the same value as the previously determined phase difference with regard to the time points $t_4$ and $t_5$.

If on the other hand the braking power is to be reduced, it is possible accordingly to select the phase shift positive. Overall, it is apparent that it is possible to realize a simple control of the braking power and as a result also of the braking torque by the synchronous machines 12, 14 with the result that it is hereby also possible to realize operational safety.

Figure 5:
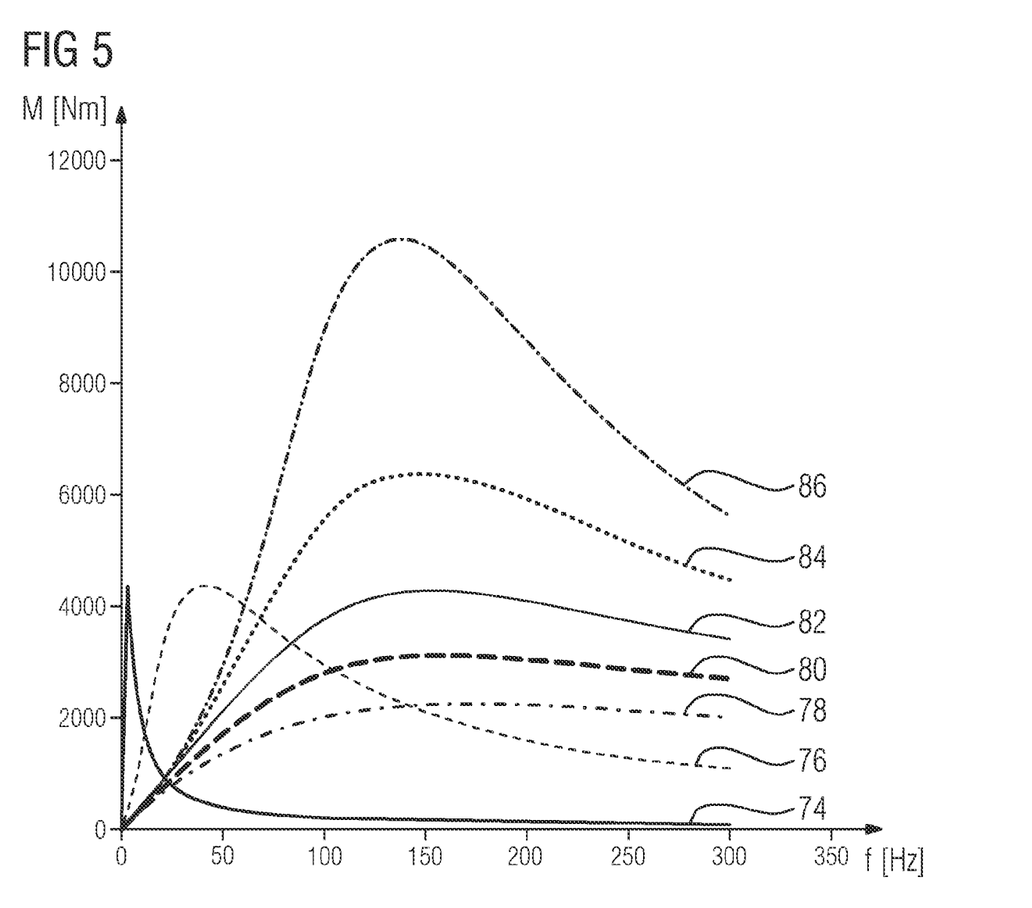
FIG. 5 shows a schematic diagram representation that explains braking torques that can be realized in dependence upon a phase difference as in accordance with FIG. 4.

The possibilities for setting the braking torque according to the braking power in dependence upon the phase shift are explained below with the aid of a schematic diagram in accordance with FIG. 5. The ordinate of the diagram in FIG. 5 is allocated to the braking torque M in Nm. The abscissa is allocated to the frequency in Hz. The frequency relates in this case to the frequency of the respective phase alternating currents $i_u$, $i_v$, $i_w$, as they are provided instantaneously by the synchronous machines 12, 14. This frequency also determines the clock-pulse rate of the switching signals for the switching elements 20, 22, 24, 26, 28, 30.

Graphs 74 to 86 illustrate by way of example selected setting possibilities. In this case, graph 74 corresponds to a braking torque that can be realized in the case of a short circuit of the phases U1, V1, W1 of the synchronous machines 12, 14. It is apparent that the braking effect considerably reduces even in the case of a frequency of approx. 20 Hz of the phase alternating currents of the synchronous machine 12, 14.

The graph 82 illustrates a resistance braking procedure that can be realized by virtue of the fact that the energy that is provided by the synchronous machines 12, 14 is supplied to the intermediate circuit 38 and is converted into heat by the resistance units 42. In this case, the inverters 16, 18 are only operated as rectifiers.

The graph 76 illustrates a progression for a braking effect that can be realized by switching between the resistance braking procedure in accordance with the graph 82 and the short circuiting of the phases U1, V1, W1 in accordance with the graph 74 in that switching between these operating modes is performed on the basis of clock-pulses. A duty cycle in this case is approx. 50%. The graph 76 therefore illustrates a frequency-dependent progression of a braking torque in which switching between the functions in accordance with the graphs 74, 82 is pulsed at approx. 50%. However, it is apparent that the maximal possible braking torque during operation in accordance with the graphs 74, 76 and 82 is however always approx. identical in value. However, this is generally not sufficient for the case of rapid braking or for the case of the emergency braking procedure.

The graphs 78 and 80 and also 84 and 86 illustrate braking torques that can be realized and can be realized by setting phase shifts. The control method that is explained with the aid of FIG. 4 by the clock-pulse generator 56 is used for this purpose.

The graphs 78, 80, 84 and 86 relate to braking torque progressions that can be realized by means of the control method in accordance with FIG. 4. In this case, the graph 78 demonstrates a progression for a phase shift of +30°. The graph 80 relates to a phase shift of +15°. The graph 84 relates to a phase shift of −15°. The graph 86 relates to a phase shift of −30°. It is apparent that in accordance with the control concept in accordance with the invention the maximal braking effect or the maximal braking torque can be set in a very flexible manner in dependence upon the phase shift. As a consequence, the method of the invention can also be used for the rapid braking procedure or for the emergency braking procedure. In contrast, it is apparent with the aid of the graphs 74, 76 and 82 that the maximal braking torque can essentially not be influenced.

At the same time, the invention renders it possible to be able to set the braking torques using a particularly simple control concept with the result that the requirements with respect to operational safety can also be reliably realized in the case of rapid braking or in the case of an emergency braking procedure. Overall, the exemplary embodiments demonstrate how with simple means it is possible to set the braking power or the braking torque in a flexible manner, in particular a high braking effect can be set. In this case, it is possible to use existing facilities of the vehicle 10 with the result that the invention can also be integrated retrospectively into already existing vehicles in a simple manner.

The exemplary embodiments serve exclusively to explain the invention and are not to limit said invention.

The invention claimed is:

1. A method of operating switching elements of an inverter of a vehicle that is driven by at least one synchronous machine, wherein the inverter has at least one series connection of the switching elements for each phase of the synchronous machine electrically coupling the synchronous machine to a DC voltage intermediate circuit that is connected to the inverter, the method comprising:
when the vehicle is braked by way of the synchronous machine, setting a clock-pulse rate for operating the switching elements to correspond to a frequency of respective phase alternating currents provided by the synchronous machine, determining zero points of the phase alternating currents and operating the switching elements to set a predetermined phase difference between the respective phase alternating current of the phase alternating currents and a respectively associated phase alternating voltage, to thereby supply electrical energy provided by the synchronous machine at least in part to the DC voltage intermediate circuit.

2. The method according to claim 1, wherein the vehicle is a rail-bound vehicle.

3. The method according to claim 1, wherein the synchronous machine is one of a plurality of synchronous machines for driving the vehicle.

4. The method according to claim 1, wherein the synchronous machine is a multi-phase synchronous machine having at least three phases.

5. The method according to claim 1, wherein the DC voltage intermediate circuit has two intermediate circuit potentials and the method comprises activating, at least in part simultaneously, only the switching elements that are directly coupled to the same intermediate circuit potential of the DC voltage intermediate circuit.

6. The method according to claim 5, which comprises selecting the intermediate circuit potential in dependence upon an instantaneous phase position of the phase alternating currents.

7. The method according to claim 1, which comprises determining the predetermined phase difference in dependence upon an instantaneous intermediate circuit voltage of the DC voltage intermediate circuit.

8. A method for braking a vehicle that is driven by at least one synchronous machine, wherein the synchronous machine is electrically coupled by way of an inverter, which has, for each phase of the synchronous machine, at least one series connection with switching elements to a DC voltage intermediate circuit that is connected to the inverter, the method which comprises:
specifying a braking power for braking the vehicle;
setting a clock-pulse rate for operating the switching elements in dependence upon a frequency of respective phase alternating currents generated by the synchronous machine when the vehicle is braked by the synchronous machine to thereby supply electrical energy provided by the synchronous machine to the DC voltage intermediate circuit;
converting the electrical energy supplied by the synchronous machine to the DC voltage intermediate circuit when the vehicle is braked into heat by an electrical resistance unit that is connected to the DC voltage intermediate circuit;
thereby operating the switching elements in accordance with the method according to claim 1, and setting a phase difference between the respective phase alternating current and a respectively associated phase alternating voltage in dependence upon the braking power.

9. The method according to claim 8, wherein the vehicle is a rail-bound vehicle.

10. The method according to claim 8, wherein the synchronous machine is one of a plurality of synchronous machines for driving the vehicle.

11. The method according to claim 8, wherein the synchronous machine is a multi-phase synchronous machine having at least three phases.

12. The method according to claim 8, which comprises further setting the phase difference in dependence upon a current rotational speed of the synchronous machine.

13. The method according to claim 8, wherein the braking power is determined in dependence upon an instantaneous maximum possible braking power.

14. An electrically drivable vehicle, comprising:
at least one synchronous machine for driving the vehicle in a driving operation;
at least one DC voltage intermediate circuit;
at least one inverter connected to said at least one DC voltage intermediate circuit;
at least one series connection for each of phase of said at least one synchronous machine, said at least one series connection containing switching elements for connecting to a respective phase of said at least one synchronous machine, in order to electrically couple said at least one synchronous machine to said at least one DC voltage intermediate circuit;
at least one electrical resistance unit connected to said at least one DC voltage intermediate circuit and configured to convert electrical energy that is supplied by said at least one synchronous machine to said DC voltage intermediate circuit when the vehicle is braked by said synchronous machine into heat; and
a clock-pulse generator according to claim 8,
said clock-pulse generator being configured for operating said switching elements of said at least one inverter and being configured, when the vehicle is braked by said at least one synchronous machine, to set a clock-pulse rate for operating said switching elements in dependence upon a frequency of respective phase alternating currents that are generated by said at least one synchronous machine, in order to supply at least in part to said at least one DC voltage intermediate circuit electrical energy that is provided by said at least one synchronous machine; and
said clock-pulse generator being configured to set a phase difference between the respective phase alternating current of the phase alternating currents and a respectively associated phase alternating voltage in dependence upon a predeterminable braking power.

15. The vehicle according to claim 14, wherein the vehicle is a rail-bound vehicle.

16. The vehicle according to claim 14, wherein the at least one synchronous machine is one of a plurality of synchronous machines for driving the vehicle.

17. The vehicle according to claim 14, wherein the synchronous machine is a multi-phase synchronous machine having at least three phases.

18. A clock-pulse generator for operating switching elements of an inverter of a vehicle to be driven by at least one synchronous machine, wherein the inverter has, for each phase of the at least one synchronous machine, at least one series connection with the switching elements for electrically coupling the at least one synchronous machine to a DC voltage intermediate circuit that is connected to the inverter, and wherein:
the clock-pulse generator is configured, when the vehicle is braked by the synchronous machine, to set a clock-pulse rate for operating the switching elements in dependence upon a frequency of respective phase alternating currents that are provided by the synchronous machine in order to supply at least in part to the DC voltage intermediate circuit electrical energy that is provided by the synchronous machine;
the clock-pulse generator is configured to set the clock-pulse rate according to the frequency of the phase alternating currents so that the clock-pulse rate corresponds to the frequency of the respective phase alternating currents that are provided by the synchronous machine, to determine zero points of the phase alternating currents, and to operate the switching elements to thereby set a predetermined phase difference between a respective phase alternating current of the phase alternating currents and a respectively associated phase alternating voltage.

19. The clock-pulse generator according to claim 18, wherein the vehicle is a rail-bound vehicle.

20. The clock-pulse generator according to claim 18, wherein the synchronous machine is one of a plurality of synchronous machines for driving the vehicle.

21. The clock-pulse generator according to claim 18, wherein the synchronous machine is a multi-phase synchronous machine having at least three phases.

* * * * *